Jan. 5, 1954  G. J. L. V. BERGHE ET AL  2,665,186
CHRONOCOUNTER FOR MEASURING OUTPUT OF FLUIDS
Filed July 12, 1947  7 Sheets-Sheet 3
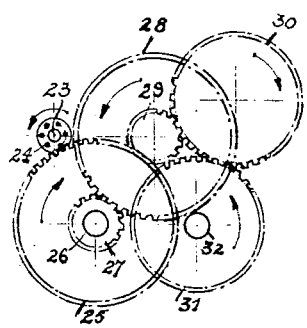
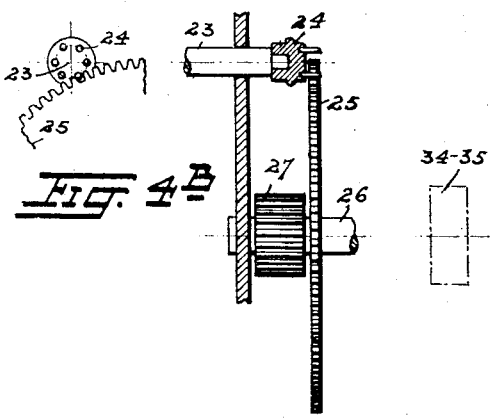
Fig. 4.   Fig. 4ᴬ.
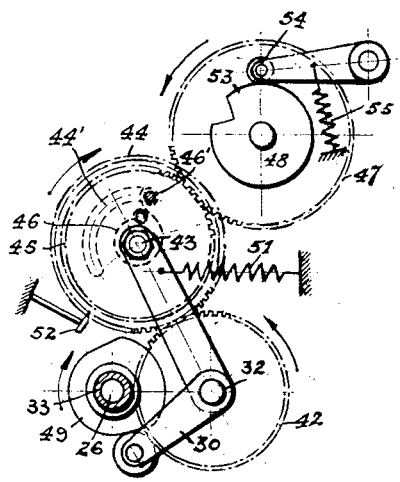
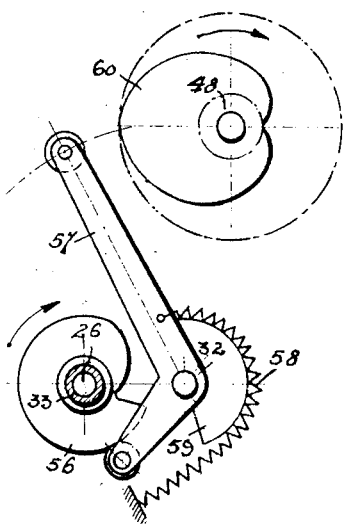
Fig. 5.   Fig. 6.
INVENTORS
GEORGES JEAN LOUIS VANDEN BERGHE
PHILIPPE JACQUES FIDÈLE SCHAEFER
BY Otto Munk
THEIR ATTY

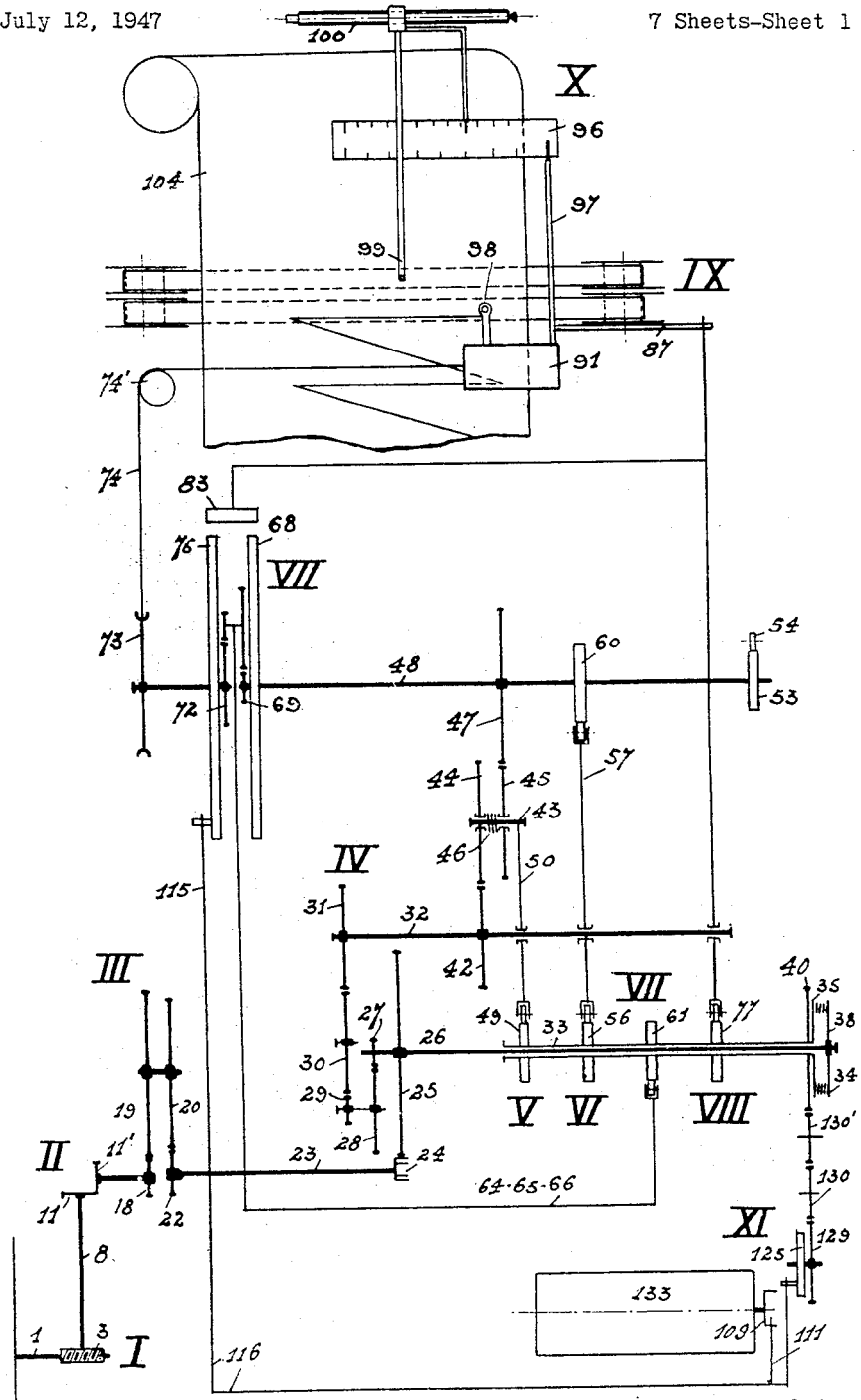

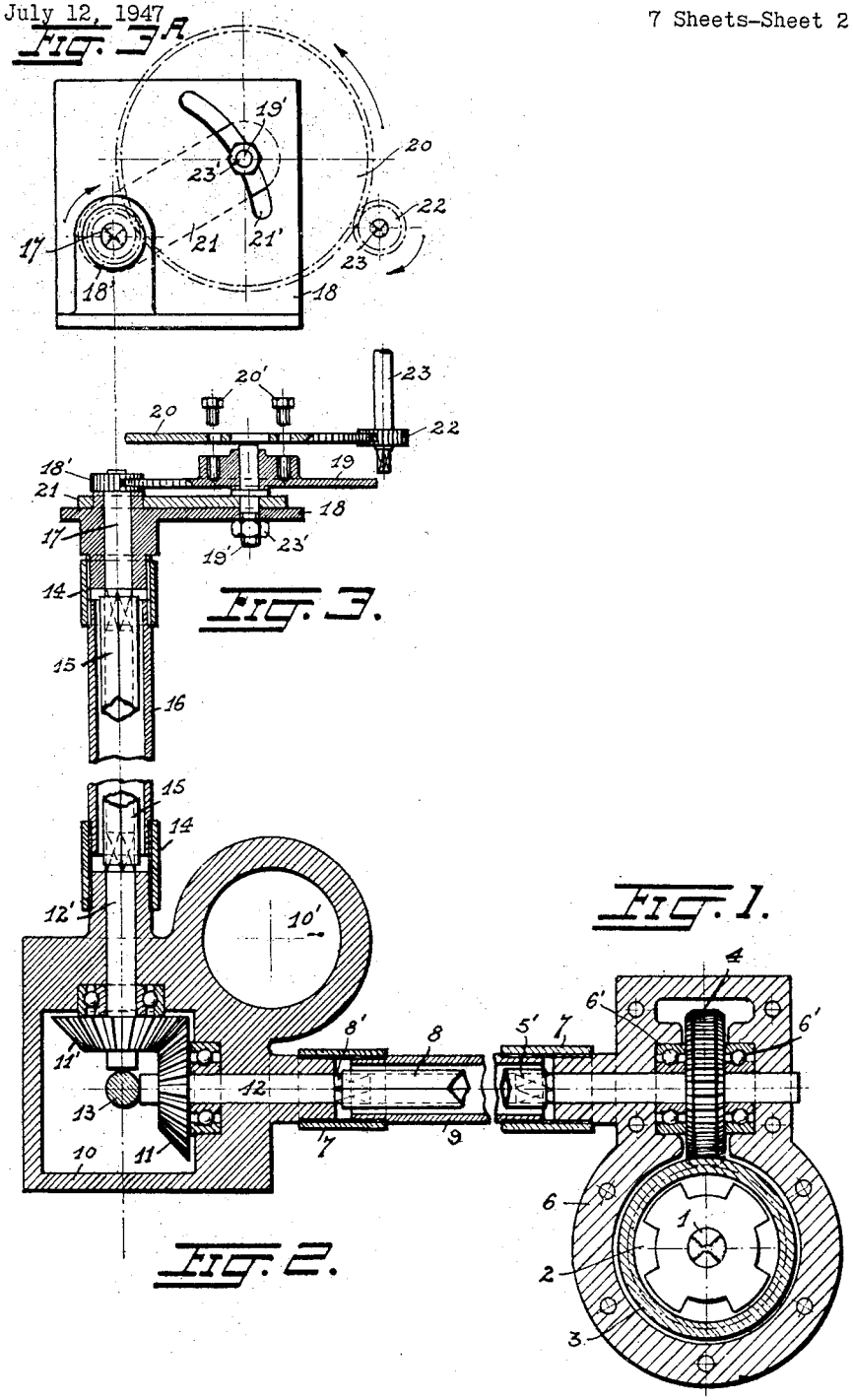

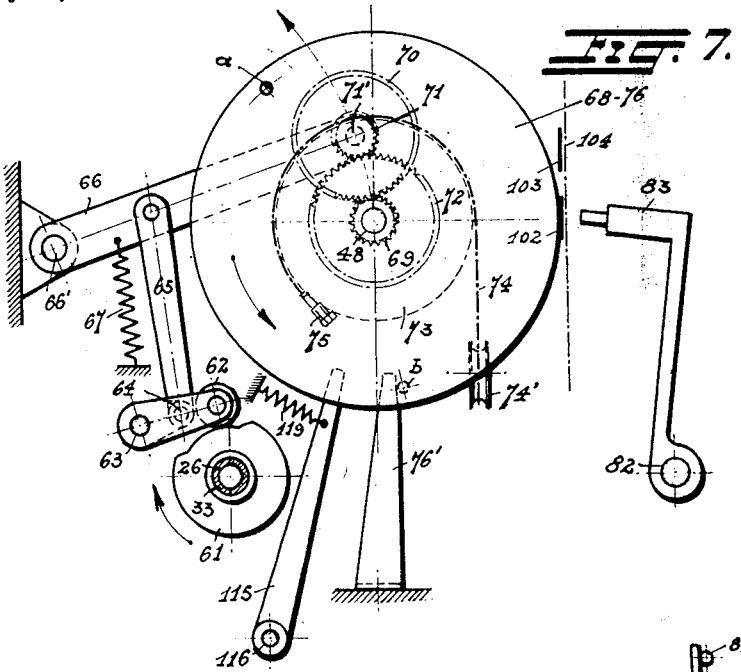
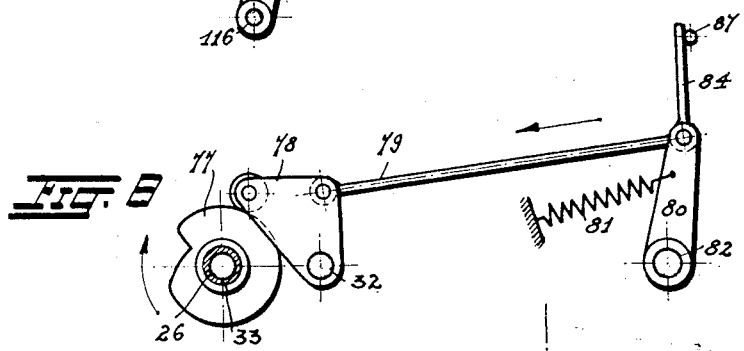
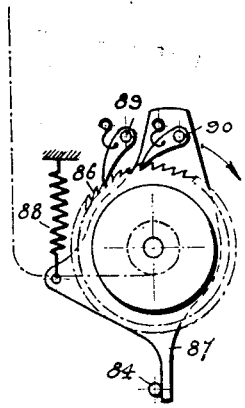

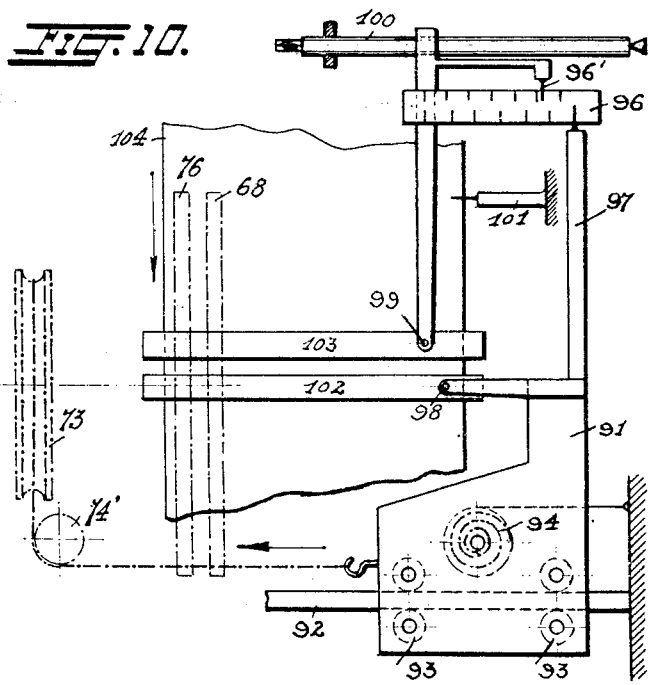
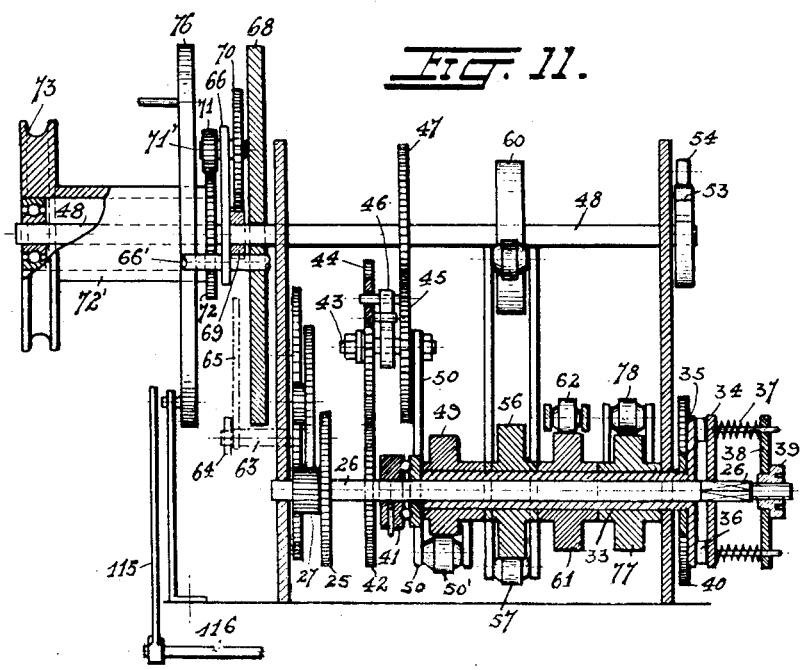

Jan. 5, 1954  G. J. L. V. BERGHE ET AL  2,665,186
CHRONOCOUNTER FOR MEASURING OUTPUT OF FLUIDS
Filed July 12, 1947  7 Sheets-Sheet 6
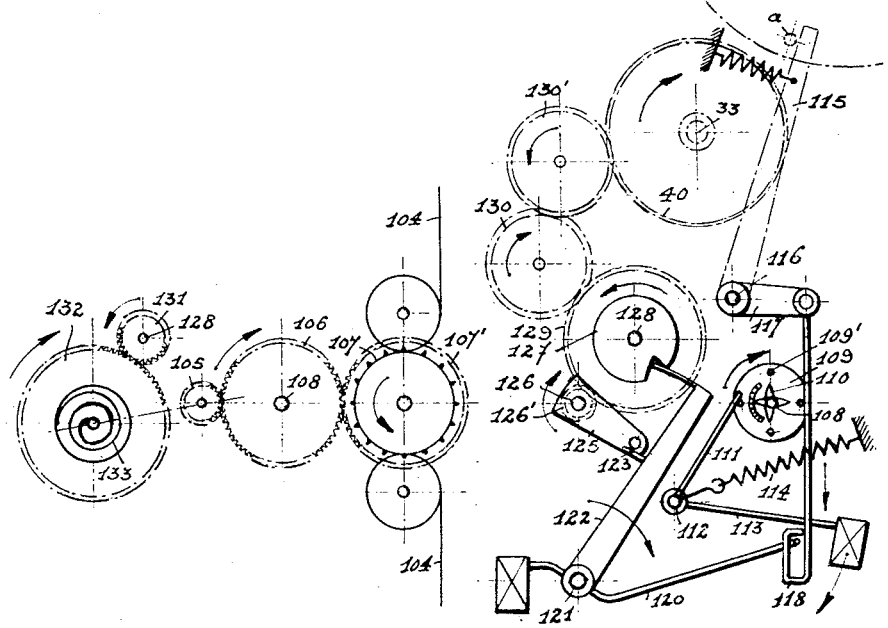
*Fig. 12.*  *Fig. 13.*
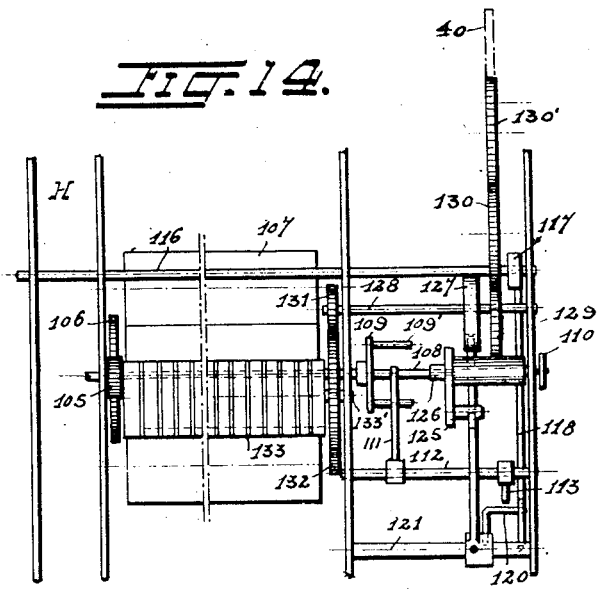
*Fig. 14.*
INVENTORS
GEORGES JEAN LOUIS VANDEN BERGHE
PHILIPPE JACQUES FIDÈLE SCHAEFER
BY
THEIR ATTY Patented Jan. 5, 1954

2,665,186

UNITED STATES PATENT OFFICE 2,665,186

CHRONOCOUNTER FOR MEASURING OUTPUT OF FLUIDS

Georges Jean Louis Vanden Berghe and Philippe Jacques Fidèle Schaefer, Brussels, Belgium, assignors to Societe Anonyme de Distribution du Gaz (Distrigaz), Brussels, Belgium, a Belgian company Application July 12, 1947, Serial No. 760,658
In Belgium October 11, 1940

Section 1, Public Law 690, August 8, 1946
Patent expires October 11, 1960

5 Claims. (Cl. 346—33)

Our present invention relates to apparatus for measuring or controlling outputs of fluids.

In the domain of electricity some apparatus are already known which are specially devised for counting and registering quantities of electric energy taking into consideration certain special clauses of tariffs inserted in the contracts.

This electric energy is sold, almost generally, under tariffs which take into consideration not only the quantity of energy, but also the power absorbed. The client pays a certain sum per kwh. consumed and also a certain sum per kwh. of maximum peak of the power absorbed during the course of a given period. For technical reasons this so-called peak (pointe) or instantaneous output is in reality the greatest consumption of energy during a quarter of an hour; it is called the "quarter-hour peak of power." The less variable the power, and therefore the more regular the consumption is, the lower is the price of the unit of energy. It is in view of the application of these principles that there exists quarter-hour power registers called "maxi-graphs."

In the present gas industry, for example, an analogous problem is met with, but in a more imperious manner, as gas is produced almost solely by coke furnaces. As the emission of gas from a battery of furnaces has to be as regular as possible, it follows that it is not only for reasons of cost price but also for purely technical reasons that the absorptions of gas must be as regular as possible. It is for this reason that the majority of contracts for the supply of gas impose constant hourly consumptions more or less close to $x\%$. If this obligation is not observed, there may result very serious troubles, first of all for the producer, and then in the effecting of the transport of gas to any distance, as the gas pipes and the compressing posts are capable of a maximum instantaneous output which cannot be exceeded. As the instantaneous output is partly regulated by the gasometers, it is permitted to replace the notion of instantaneous output by that of hourly output, instead of the quarter-hour output, as in the case of the distribution of electricity.

The object of our invention is to procure, for the industry engaged in the distribution of fluids, an apparatus analogous to that already known for electricity and which is destined (while taking into account the nature of the source of the energy sold) to register the quantities of fluid passing through a meter during equal successive periods and of a relatively short duration, one hour for instance.

The attached drawings show a form of embodiment of the invention in the case of an application to a gas meter.

Fig. 1A represents diagrammatically the whole of the control device.

Figs. 1, 2, 3 and 3A show an example of realisation of the transmission mechanism intended to connect the control apparatus with the gas meter the output of which it has to control.

Figs. 4, 4A and 4B represent the mechanism of transmission to the two principal shafts of the apparatus which are intended for the driving of different mechanical movements of the latter.

Fig. 5 is a diagrammatic representation of a gullet-tooth coupling and of a recuperation device.

Fig. 6 shows a device for the purpose of bringing back to zero the recorder plate for the units and tens after each period of counting.

Fig. 7 shows a liaison mechanism between the recorder plate for units and tens and that for hundreds and thousands, together with the registering device in diagram form.

Fig. 8 represents diagrammatically the striking mechanism which co-operates with the recorder plates.

Fig. 9 represents the mechanism of control for the winding of the inking ribbons.

Fig. 10 is a complete diagram of the recording device of the control graphic.

Fig. 11 is a section through the whole apparatus along the cam-bearing shaft.

Figs. 12, 13 and 14 show in diagram the clockwork mechanism, the control device of the paper strip and the hourly mechanical trigger for releasing the different movements of the apparatus.

Figure 15:
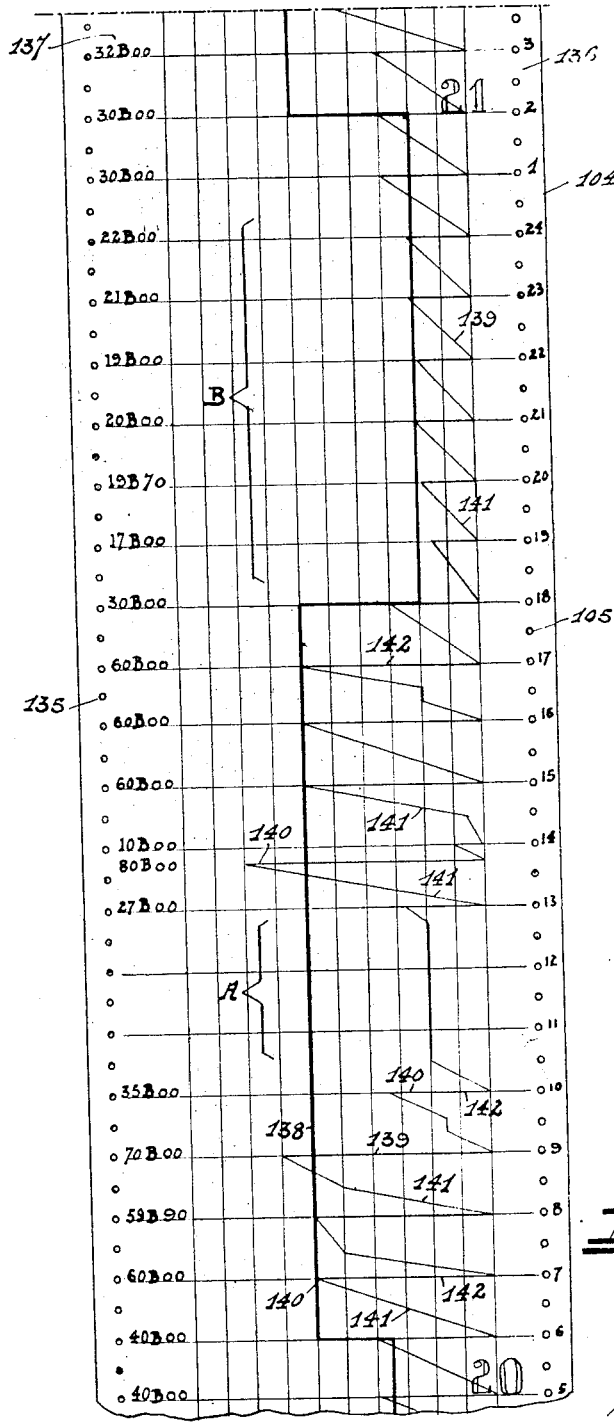
Fig. 15 represents a piece of the paper band duly registered such as the latter presents itself after a certain number of hours of working of the apparatus, bearing inscriptions and a graph corresponding to different outputs, regulations of output and certain anomalies of running, such as these latter may happen in actual practice.

In these figures, reference 1 indicates the axle of transmission of the index clockwork of a gas meter, a driving block 2 transmits the movement of rotation of this axle to an endless screw 3 which gears into a helicoidal wheel 4, which is solidary with an axle 5. The whole of this mechanism is lodged in an airtight case 6, and the axles 1 and 5 are mounted on roller bearings 6'.

The axle 5 terminates in a square part 5' which engages with an extremity of a transmission tube 8, also of square section. The other extremity of the tube 8 engages on the squared extremity 8' of an axle 12 lodged in a case 10 and mounted on roller bearings.

The axle of the transmission 8 is surrounded by a protecting tube 9 which is connected to the gear cases 6 and 10 by the sleeves 7.

Inside the gear case 10, the axle 12 is fitted with a bevel gear 11 which gears into another bevel gear 11' mounted on an axle 12' which is also lodged in the wall of the gear case 10 and mounted on roller bearings. The axle 12' is also prolonged by a hollow axle 15 of square section and protected by a tube 16 connected with the gear case 10 by a sleeve 14. The gear case 10 is fitted with a fixing lug 10'.

At the other extremity of the axle 15 there is coupled an axle 17 freely carried on a support 18 and fitted with a pinion 18'. On the axle 17 and in proximity to the pinion 18' there is mounted, freely rotating, an arm 21 fitted at its other extremity with a fixed axle 19'.

On the axle 19' there turns freely a toothed wheel 19 which gears with the pinion 18' whilst another toothed wheel 20 made solidary with the gearing 19 by means of the screws 20', gears with a pinion 22 mounted on an axle 23. The axle 19', solidary with the arm 21, may slide in a groove 21' made in the support 18 and concentric with the axle 17. It is fixed in this groove by a bolt 23' in a suitable position in accordance with the hereinafter mentioned indications, and the arm 21 may also occupy positions inclined in accordance with different angles. The method described above constitutes the liaison and transmission device between the gas meter and the control apparatus forming the subject of the invention; it is designed in such a way that it facilitates the choice of the location of this latter as compared with the former, and this thanks to the presence of the bevel-gear transmission and the transmission tubes.

The double train of toothed wheels 18'—19 and 20—22 constitutes the mechanism of inlet and of decimal transformation of the control apparatus. The toothed wheels 20 and 22 are the only pieces that may vary in dimension as between one apparatus and another, all the other parts of the apparatus being of a standard type for all types of gas meters. It is indeed these two wheels 20 and 22 which permit of the adaptation of a control apparatus to a gas meter of any type whatsoever, for it is at this point of the apparatus that one ascertains the volume corresponding to a complete revolution of the axle of the wheels of the gas meter. With the exception of these two gears 20 and 22, all the parts of the apparatus are interchangeable from one apparatus to another. The number of teeth of the wheels 20 and 22 is calculated in such a manner that one rotation of the pinion 22 corresponds to the passage of 10 cubic metres of gas in the meter. The axle 23 is considered as the axle of the units. In adjusting the position of the arm 21, one succeeds in ensuring, in spite of the variable dimensions of the wheels 20 and 22, the transmission of the movement of rotation of the pinion 18' to the pinion 22 in the desired ratio.

The units axle 23 terminates with a cantilever pinion 24, shown more in detail in the Figures 4A and 4B. If, for any reason whatever (for instance, abnormal resistance), the working of the apparatus should become defective or impossible even to the point that certain organs would run the risk of becoming wrecked, it is the spindles of the cantilever pinion 24 which would break, thus limiting the damage to a minimum and permitting of a repair of the apparatus within a very brief time.

The pinion 24 transmits its movement to a toothed wheel 25 on a shaft 26: this shaft bears a pinion 27 which transmits its movement to a second shaft 26; this shaft bears a pinion 27 which transmits its movement to a second shaft 32 through the intermediary of the pinions and gear wheels 27, 28, 29, 30 and 31, which are indispensable for ensuring to the shaft 32 a direction and a speed of rotation which are suitable (Fig. 4).

The axles 26 and 32 are organs which, as will be seen further on, play an important part in the working of the apparatus.

Fig. 11 shows more in detail the organs carried and controlled by the shaft 26. At one of its extremities the latter terminates in a friction plate 34 with which it is solidary. On this plate are mounted small friction blocks 36 of cork, which as will be seen further on, carry with them at the desired moment a plate 35 solidary with a cam-bearing sheath 33 carried on the axle 26. The pressure of the cork blocks on the plate 35 may be regulated by means of a regulating nut 39 which acts on a plate 38, which in its turn tightens or loosens springs 37 which press on the friction plate 34. On the other hand, on the cam-bearing sheath and solidary with the latter, there is mounted a toothed wheel 40, the function of which will be indicated later on.

The sheath 33 also bears four cams 49, 56, 61 and 77, which control respectively the recuperation mechanism, the device for returning the recorder plates to zero, the mechanism of liaison between the recorder plates and the striking mechanism, all hereinafter described.

As mentioned above, the rotary movement of the units axle 23 is transmitted through the intermediary of various gear wheels and pinions (25—27—28—29—30) to the toothed wheel 31 which ensures the rotation of the transmission axle 32. On this axle there is wedged a toothed wheel 42 (Fig. 5) which gears with a toothed wheel 44 solidary with a gullet-toothed gear wheel 45, which in its turn gears with a toothed wheel 47. This gear wheel 47 drives the shaft 48 which bears the recorder plate 68 (Fig. 11) for units and tens at one of its extremities, whilst the other extremity bears a notched plate 53 which co-operates with a stopping lever 54 subject to the draw-back action of a spring 55. A fixed catch 52 (Fig. 5) co-operates with the gullet-toothed wheel 45.

On the cam-bearing sheath 33 there is fixed a cam 49 which co-operates, through the intermediary of a roller 50', with the extremity of a lever 50 capable of oscillating on the shaft 32 and which is subject to the action of a drawback spring 51. The other extremity of the lever 50 bears the axle of the toothed wheels 44 and 45 which turn freely on the latter and are elastically interconnected by a spiral spring 46. The wheel 45 bears a pin which penetrates into the groove 44' made in the wheel 44 and made concentric to the axis of the latter.

The mechanism described above and represented in Figs. 5 to 11 carries out the so-called operations of metering and recuperation, as will be explained further on.

Fig. 6 shows the return-to-zero device of the recorder plate 68 after registering. It consists of a cam 56 mounted on the sheath 33. This cam co-operates with a lever 57 which is subject to the action of a draw-back spring 58 co-operating with a sector 59. The lever 57 oscillates on the shaft 32 and acts on a heart-shaped cam 60 wedged on to the shaft 48, as will be mentioned further on.

Figures 7 and 11 show more specially the liaison device which exists between the recorder plate 68 for the units and tens and the plate 76 for the hundreds and thousands. Axle 48 bears at the extremity which supports the plate 68 for the units and the tens, a pinion 69 which gears with a toothed wheel 70 solidary with a pinion 71 and both carried by a common axle 71' mounted at the extremity of a lever 66 which oscillates round a fixed axle 66' traversing the other extremity of the lever 66. This latter is subject to the action of a drawback spring 67. The oscillating movement of the lever 66 is controlled by a rod 65 articulated at its other extremity on a lever 64, solidary with the shaft 63 and which bears a roller 62 co-operating with a cam 61 mounted on the cam-bearing sheath 33.

On the other hand, the pinion 71 gears into a toothed wheel 72 solidary with a sleeve 72' which itself is solidary with the plate 76 and with a drum 73. On the drum 73 there is rolled a cable 74 (Fig. 10), which is fixed by a micrometric screw 75 (Fig. 7) in order to allow of its regulation. The cable 74 passes round a small reversing pulley 74'. The plates 68 and 76 are fitted with stop buttons a and b. One of them, a, is a button that is displaceable on the periphery of the plate and co-operates with a lever 115 on an axle 116 and subject to the action of a pullback spring 119, whilst the other one, b, is a stop which co-operates with a fixed thrust 76'.

A striking hammer 83 co-operates with the recorder plates. An oscillating movement is impressed on it by a shaft 82 on to which it is wedged.

The control mechanism of this striking hammer consists of a cam 77 (Fig. 8) wedged on to the sheath 33 and which imparts a movement of oscillation to a lever 78 capable of oscillating on the shaft 32. This lever 78 is connected by a rod 79 to a lever 80 solidary with the axle 82 and is subject to the action of a drawback spring 81. It is itself prolonged by a rod 84 which controls the winding device of the inking ribbons (Fig. 9), the type of which is similar to those utilised in typewriting machines and is composed essentially of an axle 85, of a racket wheel 86 co-operating with two pawls (corbeaux), one for holding back 89, and one for driving 90. Pawl 90 is mounted on an oscillating piece 87, which receives its movement from the rod 84.

In Fig. 10, the reference 104 represents the paper band intended to receive the different control inscriptions registered thereon by the two stylets 98 and 99 and by the plates 68 and 76 through the intermediary of the differently coloured inking ribbons 102 and 103.

The stylet 98 is solidary with a movable carriage 91; the movement of translation of which is controlled by the rotation of the plate 76 and as a function of that rotation, thanks to the cable 74 which connects the organs with each other. A drawback barrel 94 and a cable 95 ensure the backward return of the carriage 91.

The movement of translation of the carriage is guided by a guide 92 and rollers 93 fixed on the carriage.

An index 97 fixed on the carriage and capable of moving in front of a graduated scale 96, enables one to read at any moment on this scale the quantity of gas that has passed through the meter during a given time. In front of the graduated scale 96 there is also a second index 96' which forms one body with the holder of the stylet 99 and which can be displaced at will by means of a regulating screw 100. The object of this second index is to indicate the quantity of gas which it is necessary to take in order to meet the anticipated quantity of gas for a given time. It indicates it on the graph by, for instance, a red line.

For the timing of the graph paper, it is sufficient to be guided by the guide pin 101 (Fig. 10), the adjustment of which with the point of striking of the hammer 83 is, for instance, exactly two hours.

The Figures 12, 13 and 14 show the chronometric mechanism of drive of the band of paper and the releasing of the various mechanisms of the control apparatus.

In these figures H designates the location of a time measurer, for instance, a piece of clockwork, which is of an usual and well known type, and the object of which is to allow at regular intervals of releasing of the organs controlled by the gas meter.

The pinion 105 receives the hour movement of the pendulum and transmits the latter to the toothed drum 107 which draws the paper, through the intermediary of the gear wheels 106 and 107'. The gear wheel 106 is designed in such a manner that a complete rotation of same is made in four hours. This gearing drives a transmission axle 108 on which is fixed a plate 109 fitted with four pegs 109'. The axle 108 also bears a handle 110 for adjusting the hour of the paper. By pulling this handle one liberates the pinion 106, whereupon the cylinder 107 may revolve freely.

The pegs 109' act on a release finger 111 which oscillate round on axle 112 and co-operates with a surprise 113. All the parts 111—112—113 are subject to the drawback effect of a spring 114.

The surprise 113 acts on a calibrated release 120 capable of oscillating round an axle 121 which bears a release lever 122 fitted at half length with a release stop 123, and at its extremity with a finger 124. This stop 123 co-operates with a winch (moulinet) solidary with an axle 126 and forming a solid body with a pinion 126'. This latter gears into a wheel 129 carried on an axle 128 on which there is wedged a notched cam 127, into which there may penetrate the finger piece 124 of the lever 122. The purpose of this device is to liberate at regular intervals, counted by the clockwork movement of pendulum H the organs of the meter which have to function by the rotation of the gas meter. The toothed wheel 129 receives its movement from the gear 40 carried on the cam bearing sheath 33 (Fig. 11), and this through the intermediary of the gears 130 and 130' and it is this winch (moulinet) 125 depending on the wheel 129 which co-operates with the stop 123 to block or to liberate the organs at the same time as the finger 124 and the cam 127.

On the other hand, an axle 116 bears, wedged on to it, a lever 117, at the other extremity of which oscillates a rod 118 which co-operates with the equilibrating release 120. This latter can therefore be worked by the thrust a which provokes the rotation of the axle 116 by the lever 115.

This surprise release presents the advantage of permitting the apparatus to be worked any indefinite number of times per hour, without causing any disturbances in the hourly registering.

The reference 133 designates a series of springs mounted in series on an axle 133' and which are automatically wound up by gears 132 and 131 at intervals determined by the speed of rotation of the gas meter. The gear 131 is in fact mounted on the axle 128 which receives its movement from the gas meter through the intermediary of the metering mechanism already described (sheath 33, plate 35, axles 26, 23 and 1). At the time of starting up, the springs 133 are wound to approximately a half of their capacity. They provoke the working of the pendulum H; but, at regular intervals, they are wound up by the rotation of the axle 128 which is put in movement by the gas meter as soon as the apparatus is released, and the movement of rewinding of the clockwork is then effected during the time of the duration of the rotation of the sheath 33 carrying the different cams. This periodic rewinding maintains for the springs 133 a reserve of power in the event that, for any reason whatever, the speed of the gas meter should become very weak. This effects a reserve of running power for the clockwork that may extend over several hundreds of hours. This duration is evidently a function of the number of springs placed in series and of the power of each of them. The chronometer may thus work without any outside intervention such as electric current or other outside source of energy. This arrangement of periodic rewinding gives to the apparatus complete guarantee of independence, protecting it from the danger of fire or explosion.

The apparatus being thus built, its working will be described hereinafter by referring by way of example to a recorded band of paper, shown in Fig. 15, which shows a graph referring to a working period of about 24 hours.

On this diagram, 104 indicates, as already stated, the band of paper, and 135 the drive perforations. 136 represents the hours column. In the column of volumes 137, the two first figures represent thousands and hundreds, the letter B indicates the distributing apparatus, and the two last figures represent the tens and units of cubic metres.

The line 138 is that traced by the stylet 99 and registers the hourly volume which has to be taken in order to meet the estimated quantity for the 20th of the month. The broken line 139 is the diagram which, by its points 140, indicates the volumes of gas actually taken at regular intervals, for instance one hour in the example chosen.

The control apparatus consists of two devices quite distinct from each other and which co-operate together: one, the metering mechanism which is controlled by the gas meter, and the other, the hourly mechanism controlling the displacement of the band of paper and the release of the recording mechanism which is controlled by the pendulum.

The metering device receives its movement from the cantilever pinion 24 which transmits the latter to the two principal axles 26 and 32 through the intermediary of the toothed wheels 25, 27, 28, 30, 31 (Fig. 4). The shaft 32 controls the rotation of the recorder plate 68 through the intermediary of the gears 42, 44, 45, 47. The rotation of this plate is therefore a direct function of the speed of the gas meter and presents to the striking hammer 83 the figures corresponding to the volume of gas that has passed through the meter.

The mechanical liaison established between the plate-bearing axle 48 and the plate 76, brings about the necessary demultiplication by 10. The rotation of the plates is effected during one hour. At the expiration of this time, one of the pins 109' of the chronometric device (Figs. 13 and 14) disengages the rod 111 of the surprise 113, the effect of which is to cause the latter to strike on the equilibrated release 120, which causes the release lever 122 to function in the direction of the arrow. The release rod 111 immediately returns to its primitive position, thanks to the drawback spring 114 in accordance to a device well known in connection with clockworks.

The function of the release lever has the effect of liberating the winch (moulinet) 125 the rotation of which was prevented by the stopping of the release 123, and also the cam 127 held back by the finger 124. The gear 40, solidary with the cam-bearing sheath 33, can thereafter, thanks to the friction clutch 34—35, participate in the movement of rotation of the shaft 26 and carry along the cams 49, 56, 61, 77. This latter acts, through the intermediary of the organs 78, 79, 80, 82, on the hammer 83 and produces the impression, on the band of paper, of the figures standing out in relief on the edge of the plates 68 and 76 and which correspond to the volume of gas passed through the meter during the hour just passed.

It is easy to see from what precedes and from an examination of Figs. 10 and 11, that the stylet-carrying carriage 91 has been displaced from right to left along a distance which is a function of the angular rotation of the plate 76, thanks to the cable 74 which connects this carriage to the winch 73 solidary with this plate. This transversal displacement of the carriage, and consequently of the stylet 98, combined with the descending movement of the band of paper 104, has had the effect of drawing an oblique line on this band of paper, which line is seen on the graph of Fig. 15 and which is thereon designated by the number 141.

As it is indispensable that the apparatus should indicate, after each hour, the volume of gas that has passed through the meter during that hour, it is necessary, after each striking, to liberate the plates, so as to be able to bring them back to zero position with a view to recommencing the operation of metering for the following hour.

The stopping of the plates during the striking and the bringing of them back to zero must be made whilst taking into consideration the volume of gas which passes through the meter whilst these manoeuvres are being carried out. This is effected in the following manner.

A few instants, before the striking, the cam 49 comes and acts on the lever 50 and thereby throws out of gear the toothed wheels 45 and 47, which has the effect of immobilizing the recorder plates. At the moment when the gear 45 no longer gears with the wheel 47, it is immobilised by the stop pin 52. During this stoppage the meter continues to turn; and consequently also the pinion 24, and the gear 42 gears with the toothed wheel 44, in which there has been contrived a recuperation lantern 44'. From the fact that the gear 44 rotates and that the gullet-tooth gear 45 is immobilized, it follows that the gear 44 tightens the spring 46 placed between them and the extremities of which are connected respectively with one and the other of the latter.

Thanks to this device, the spring 46 is tightened in proportion to the quantity of gas that has passed through the meter during the stoppage of the plates 67 and 76, and this quantity is then added to the volume registered during the following metering operation, which is effected as soon as the organs 44, 45, 50 have returned to the coupling position. When the strike has taken place and the plates have returned to zero, as will be explained further on, the cam 49, which continues to turn, releases the lever 50 which returns, thanks to the spring 51, to its primitive position, and the toothed wheel 45 again returns to gear with the toothed wheel 47 which controls the recorder plates.

As soon as the wheels 45 and 47 gear into each other, the wheel 45 is no longer held by the stop pin 52, and on this account the spring 46, which had tightened up during the above mentioned manoeuvres, becomes unwound and brings back the wheels 44 and 45 to their relative position by causing the recorder plates, through the intermediary of the wheel 47, to turn to an extent corresponding exactly to the volume of gas that has passed through the meter during the amount of time necessary to ensure the striking and to bring the control apparatus back to zero.

The bringing back to zero of the recorder plate 68 is ensured by the cam 56 which acts on the roller of the striking lever 57. When this lever is at the end of its course, the cam 56 suddenly releases this lever, which, under the influence of the drawback spring 58 comes and strikes the heart-shaped cam 60 carried by the axle 48, on which there is also the recorder plate 68. This has the effect of causing this plate to return to its position corresponding to zero. Each blow, rather rough, has the effect of imparting a little inertia to the heart and consequently also to the plate 68. In order to remedy this inconvenience, that is to say, in order to immobilise the plate as soon as it has returned to zero, there has been provided at the end of the axle 48, a notched disk 53 (Fig. 5) and check pulley 54; which ensure a dead stop on the plate at the desired moment and position.

As may be seen by the Figs. 7 and 11, the heart-shaped cam ensures only the return to zero of the plate 68; the plate 76 is not carried directly on the axle 48; its rotation is ensured through the intermediary of the gears 69, 70, 71, 72. At the moment of the striking of the lever 57 on the heart 60 the cam 61—which is also carried on the the cam-bearing sheath 33—acts on the lever 62 (Fig. 7) which, through the intermediary of the connecting rod 65, acts on the lever 66 and has the effect of breaking the connection between the two recorder plates. The plate 76 being now liberated, it returns to zero under the influence of the cable 95 (Fig. 10) and of the drawback drum 94, and this through the intermediary of the carriage 91 and of the drawing cable 74. In order to prevent, during this operation, the plate 76 from exceeding, through inertia, its starting position at zero, there has been provided a thrust 76' and a stop button $b$, corresponding to the zero position. As soon as the return to zero of the plate 76 is ensured, the same cam 61 provokes the regearing of the toothed wheels 70 and 71.

The sudden return back of the carriage 91 has the effect of drawing a straight horizontal line 142 on the band of paper 104 (Fig. 15).

As gas meters generally installed in distribution station have been established for a given hourly output, it is of interest to be able to check whether the output, for a given gas meter, has not been more than 150%, for instance, of the nominal output. In view of this check, there has been provided a releasing of the recorder apparatus when the output exceeds the 150% referred to above. Moreover, it is necessary to fix a maximum output in order that the scale on the graph paper and the graduation on the scale 96 may not be too small. For this purpose, a thrust $a$ has been provided on the plate 76. The position of this thrust on the periphery may be regulated at will with a view to adapting the apparatus to any gas meter whatever. When the maximum output has been reached, the button $a$ thrusts against the limit lever 115 (Figs. 7 and 13) which has the effect of acting, through the intermediary of the lever 117 on the release stirrup 118 which works the drum 125 as happens at the time of an hourly release. Thanks to this device, the paper is struck and one can easily see on the latter that at a given moment something abnormal has happened. In order to ascertain the total output for the hour during which this excess of output has occurred, it is evidently sufficient to add the two volumes as indicated for that hour on the graph paper.

The graph of Fig. 15 shows clearly that on the 20th of the month at about 13.45 an extreme nominal output of 8,000 cubic metres was reached, that is to say, that a release took place at that moment. During the quarter of an hour remaining to run before the hourly release of 14 o'clock, the meter passed 1000 cubic metres, that is to say a total of 8000 plus 1000, or 9000 cubic metres of hourly output between 13 and 14 o'clock.

In examining the graph of Fig. 15, one sees that on the 20th of the month at 6 o'clock, the man in charge of the station regulated the apparatus for an hour's output of 6000 cubic metres, by displacing the curser 96' toward the left.

Between 6 and 7 o'clock the output was normal and regular: between 7 and 8 o'clock it was normal but irregular; i. e. exaggerated at the beginning. Between 8 and 9 o'clock the output was irregular and indicates an excess of 1000 cubic metres. Between 9 and 10 o'clock the output was inferior to normal and suffered a momentary stoppage of about 10 minutes. Between 10 and 13 o'clock the quantity of gas taken shows a time of stoppage after an initial consumption a little after 10 o'clock and a renewal consumption a little before 13 o'clock. During this time of stoppage the releases for the hour did not work, and the pendulum worked on its reserve of winding up. At 18 o'clock the station master regulates the output by fixing it at 2000 cubic metres. A zone B, extending from 18 to 24 o'clock, indicates a period of running and of normal hour-outputs.

The chronometer described above and represented in the annexed drawings finds its application in the measure, during successive periods of the same duration, of the outputs of any fluids such as water, any liquids, water vapour, the other vapours, air, gases such as coking-plant gas, lighting gas, etc.

What we claim is:

1. In an apparatus for use with a meter recording the quantities of a fluid passing through a system during successive intervals of time in such a manner that at the expiration of each recording period the quantity which has been passed through the system during that period is indicated, in combination, a time measuring member, a recording apparatus including a printing disc and a movable printing hammer located adjacent the periphery of said disc, means drivingly coupling said time measuring means to said printing hammer and arranged to move said hammer toward the periphery of the disc at periodic intervals, coupling means connecting the fluid meter to the printing disc, zeroizing means operated by said time measuring means and arranged to restore said disc to zero position following each operation of said hammer, uncoupling means associated with said zeroizing means and arranged to temporarily uncouple the disc from the meter shortly before operation of the hammer, movement storage means connected between said meter and said disc, said storage means being arranged to store movements of the meter during the period when the disc is uncoupled from the meter, and means connecting the disc to said storage means immediately subsequent to the operation of the zeroizing means, whereby the stored movement of the meter is transmitted to said disc.

2. In an apparatus for use with a fluid meter recording the quantities of a fluid passing through a system during successive intervals of time in such a manner that at the expiration of each recording period the quantity which has passed through the system during that period is indicated, in combination, a time measuring means, a recording apparatus including a printing disc and a movable printing hammer located adjacent the periphery of said disc, means drivingly coupling said time measuring means to said printing hammer and arranged to move said hammer toward the periphery of the disc at periodic intervals, a gear train coupling the fluid meter to the printing disc and including a first gear coupled to the meter, a second gear coupled to the disc, and a resilient connection between said first and second gears, zeroizing means operated by said time measuring means and arranged to restore said disc to zero position following each operation of said hammer, uncoupling means arranged to temporarily uncouple said second gear from said disc prior to the operation of the hammer to hold said second gear, and to recouple said second gear to said disc immediately subsequent to the operation of said zeroizing means.

3. In a fluid demand registering apparatus for use with a fluid meter, a volume indicating mechanism controlled by said fluid meter, a displaceable indicating sheet, a timing mechanism controlling the displacement of the sheet, a rotary printing wheel controlled by said indicating mechanism and arranged adjacent said sheet, a movable printing hammer arranged adjacent said sheet opposite the printing wheel, means connecting said printing hammer to said timing mechanism and arranged to periodically strike the hammer against said sheet and printing wheel, means uncoupling the indicating mechanism from the meter immediately before the beginning of the striking period, means returning the indicating mechanism to zero position near the end of the striking period, and means recoupling the indicating mechanism to the meter at the end of the striking period.

4. In a fluid demand registering apparatus for use with a fluid meter, a volume indicating mechanism controlled by said fluid meter, a displaceable indicating sheet, a timing mechanism controlling the displacement of the sheet, a rotary printing wheel controlled by said indicating mechanism and arranged adjacent said sheet, a movable printing hammer arranged adjacent said sheet opposite the printing wheel, means connecting said printing hammer to said timing mechanism and arranged to periodically strike the hammer against said sheet and printing wheel, means uncoupling the indicating mechanism from the meter immediately before the striking period, means returning the indicating mechanism to zero position near the end of the striking period, means recoupling the indicating mechanism to the meter at the end of the striking period, means storing movement of the meter during the striking period, and means transmitting the stored movement of the meter to the indicating mechanism at the end of the striking period.

5. In a fluid demand registering apparatus for use with a fluid meter, a volume indicating apparatus controlled by said fluid meter, a displaceable indicating sheet, a timing mechanism controlling the displacement of the sheet, a rotary printing wheel controlled by said indicating mechanism and arranged adjacent said sheet, a movable printing hammer arranged adjacent said sheet opposite the printing wheel, means connecting said printing hammer to said timing mechanism and arranged to periodically actuate the hammer against said sheet and printing wheel, means arranged to actuate said printing hammer responsive to a predetermined volumetric indication of said volume indicating apparatus, means uncoupling the indicating mechanism from the meter immediately before the actuation of the printing hammer, means returning the indicating mechanism to zero position near the end of the actuation period, and means recoupling the indicating mechanism to the meter at the end of the actuation period.

GEORGES JEAN LOUIS VANDEN BERGHE.
PHILIPPE JACQUES FIDÈLE SCHAEFER.

References Cited in the file of this patent

UNITED STATES PATENTS

| Number | Name | Date |
|---|---|---|
| 924,158 | Gallagher | June 8, 1909 |
| 1,696,600 | Hall | Dec. 25, 1928 |
| 1,709,613 | Evans | Apr. 16, 1929 |
| 1,856,699 | Evans et al. | May 3, 1932 |
| 1,911,777 | Taylor | May 30, 1933 |
| 1,933,356 | Warner | Oct. 31, 1933 |
| 2,005,108 | Pudelko | June 18, 1935 |
| 2,103,077 | Herron | Dec. 21, 1937 |
| 2,145,697 | Pudelko et al. | Jan. 31, 1939 |
| 2,285,859 | Hurt | June 9, 1942 |
| 2,314,244 | Pratt | Mar. 16, 1943 |
| 2,385,772 | Borden | Oct. 2, 1945 |
| 2,421,834 | Crowther | June 10, 1947 |